United States Patent
Watson

(10) Patent No.: US 11,265,623 B2
(45) Date of Patent: *Mar. 1, 2022

(54) TECHNIQUES FOR ADVANCING PLAYBACK OF INTERACTIVE MEDIA TITLES IN RESPONSE TO USER SELECTIONS

(71) Applicant: NETFLIX, INC., Los Gatos, CA (US)

(72) Inventor: Mark Watson, San Francisco, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/008,429

(22) Filed: Aug. 31, 2020

(65) Prior Publication Data

US 2020/0404398 A1 Dec. 24, 2020

Related U.S. Application Data

(63) Continuation of application No. 16/273,082, filed on Feb. 11, 2019, now Pat. No. 10,771,865.

(51) Int. Cl.
*H04N 21/8541* (2011.01)
*H04N 21/6587* (2011.01)
(Continued)

(52) U.S. Cl.
CPC ..... *H04N 21/8541* (2013.01); *H04N 21/6587* (2013.01); *H04N 21/8456* (2013.01); *H04N 21/8545* (2013.01)

(58) Field of Classification Search
CPC ........... H04N 21/8541; H04N 21/6587; H04N 21/8456; H04N 21/8545
(Continued)

(56) References Cited

U.S. PATENT DOCUMENTS 4,305,131 A * 12/1981 Best .................. A63F 13/00
715/716
4,333,152 A 6/1982 Best
(Continued)

FOREIGN PATENT DOCUMENTS

EP 2 712 206 A1 3/2014

OTHER PUBLICATIONS

N. Uchihara, H. Kasai, Y. Suzuki and Y. Nishigori, "Asynchronous prefetching streaming for quick-scene access in mobile video delivery," in IEEE Transactions on Consumer Electronics, vol. 56, No. 2, pp. 633-641, May 2010, doi: 10.1109/TCE.2010.5505981. (Year: 2010).*
(Continued)

*Primary Examiner* — Cynthia M Fogg
(74) *Attorney, Agent, or Firm* — Artegis Law Group, LLP

(57) ABSTRACT

A playback application seamlessly advances playback of and interactive media title in response to user selections in a manner that minimizes latency and preserves user immersion in a narrative. The playback application buffers an interstitial segment included in the interactive media title and feeds portions of the interstitial segment to a media player only when those portions are needed for display. When the user selects an option displayed during the interstitial segment, the playback application begins buffering a subsequent media segment and stops feeding portions of the interstitial segment to the media player. The playback application starts feeding blocks of the subsequent media segment to the media player and then seamlessly advances playback to the subsequent media segment.

20 Claims, 10 Drawing Sheets

(51) Int. Cl.
*H04N 21/845* (2011.01)
*H04N 21/8545* (2011.01)

(58) Field of Classification Search
USPC .......................................... 725/135
See application file for complete search history.

(56) References Cited

U.S. PATENT DOCUMENTS

| | | | |
|---|---|---|---|
| 5,737,527 | A | 4/1998 | Shiels et al. |
| 6,397,326 | B1 | 5/2002 | Horton et al. |
| 9,082,092 | B1 | 7/2015 | Henry |
| 2002/0184314 | A1 | 12/2002 | Riise |
| 2006/0064733 | A1 | 3/2006 | Norton et al. |
| 2013/0259442 | A1 | 10/2013 | Bloch et al. |
| 2014/0082666 | A1* | 3/2014 | Bloch ................ H04N 21/8456 725/37 |
| 2014/0380167 | A1 | 12/2014 | Bloch et al. |
| 2016/0104513 | A1* | 4/2016 | Bloch .................. G11B 27/031 715/720 |
| 2016/0322054 | A1 | 11/2016 | Bloch et al. |
| 2017/0078447 | A1* | 3/2017 | Hancock ............... G06F 1/3215 |
| 2018/0191574 | A1* | 7/2018 | Vishnia ................ H04L 65/607 |
| 2019/0373330 | A1 | 12/2019 | Bloch et al. |

OTHER PUBLICATIONS

Krishnamoorthi et al., "Empowering the Creative User: Personalized HTTP-based Adaptive Streaming of Multi-path Nonlinear Video", XP058030682, DOI: 10.1145/2491172.2491183, Aug. 16, 2013, pp. 53-58.

* cited by examiner

TECHNIQUES FOR ADVANCING PLAYBACK OF INTERACTIVE MEDIA TITLES IN RESPONSE TO USER SELECTIONS

CROSS-REFERENCE TO RELATED APPLICATIONS

This application is a continuation of the co-pending U.S. patent application titled, "TECHNIQUES FOR ADVANCING PLAYBACK OF INTERACTIVE MEDIA TITLES IN RESPONSE TO USER SELECTIONS," filed on Feb. 11, 2019 and having Ser. No. 16/273,082. The subject matter of this related application is hereby incorporated herein by reference.

BACKGROUND

Field of the Various Embodiments

Various embodiments relate generally to computer science and, more specifically, to techniques for advancing playback of interactive media titles in response to user selections.

Description of the Related Art

A video streaming service is typically designed to provide users with access to one or more libraries of various media titles. To access a given media title, a user usually connects to the video streaming service via an endpoint device, such as a laptop computer, smart television, tablet computer, or similar device. The user can then select the given media title via a graphical user interface (GUI) that is displayed on the endpoint device and configured to allow users to make selections from a particular library of media titles. Upon selecting the given media title, the video streaming service streams media content associated with the media title to the user's endpoint device. The media content generally includes frames of video and/or audio encoded with specific encoding settings that may vary based on network conditions, user preferences, and other parameters.

A given media title may fall into a variety of different format categories, including feature-length films, episodic serials, documentary features, and so forth. Media titles may also be classified based on thematic content and could therefore be classified, for example, as "action," "romance," "comedy," and so forth. In any of these cases, a given media title usually conveys a story of some kind using a linear or non-linear narrative. A linear narrative generally tells a story by describing a set of sequentially occurring events; whereas, a non-linear narrative typically tells a story by describing a non-sequential set of events. Regardless of format category, thematic content, and narrative type, from a data perspective, most media titles have been organized historically as a single, defined sequence of video and/or audio frames, where different frames may be encoded with varying settings.

More recently, some video streaming services have started providing users with access to "interactive" media titles that allow users to make various choices during playback that affect how the stories being told in the interactive media titles unfold. For example, an interactive media title could ask a user to choose the specific clothing a character in the story should wear. Then, subsequent portions of the interactive media title would depict the character wearing the user-selected clothing. Because the storyline of an interactive media title typically changes or "branches" based on the different choices made by the user during playback, interactive media titles may be described as employing a "branching" narrative.

From a data perspective, an interactive media title adheres to a structure that is fundamentally different than the structure of a traditional media title. Notably, a typical interactive media title is structured to include different narrative components that can be assembled to tell different stories based on the user's choices. A given narrative component typically includes a media segment and an interstitial segment. The media segment tells a particular portion of a story that leads up to a choice point, while the interstitial segment displays a set of options associated with the choice point. In some cases, the interstitial segment also tells additional portions of the story. Both the media segment and the interstitial segment can include audio, video, rendered graphics, and/or user interface components. When playback of the media segment reaches the choice point, the interstitial segment is played and the user can select one of the displayed options. A given option generally corresponds to a subsequent media segment included in another narrative component. The subsequent media segment portrays how the story unfolds when the given option is selected. When the user selects a particular option, a playback application responsible for playing back the interactive media title switches playback from the interstitial segment to the subsequent media segment associated with that particular option.

Some playback applications initiate playback of the subsequent media segment by performing a "seek" operation to advance playback past the remainder of the interstitial segment to a playback position corresponding to the beginning of the subsequent media segment. One advantage of this technique is that a user is provided with a sense of instant gratification because the endpoint device appears to operate responsively to the user's selection of a particular choice at a choice point. One drawback of this technique, though, is that the endpoint device usually has to perform several time-consuming operations before playback of the subsequent media segment can actually begin. In particular, the endpoint device has to unload the remainder of the interstitial segment from media player memory, usually by closing down and reinitializing the media player. The endpoint device may also have to buffer at least a portion of the subsequent media segment before playback of that segment can commence. These operations can take several seconds to complete, especially on older endpoint devices. During this time, the endpoint device oftentimes displays a message, such as a spinning wheel animation, indicating that the user has to wait before the endpoint device is ready to play the subsequent media segment. Messages such as the spinning wheel animation tend to break user engagement with the story being told by the interactive media title because the user is reminded that the real world still exists.

To address some of the issues described above, other playback applications are configured to play back the entirety of the interstitial segment before advancing to a playback position that corresponds to the beginning of the subsequent media segment. While the remainder of the interstitial segment plays, the particular choice selected by the user is usually highlighted to indicate to the user that the user's selection was received. One advantage of this approach is that playing back the entirety of the interstitial segment keeps the user engaged with the story and/or characters and avoids the display of messages to the user. Another advantage is that the endpoint device can buffer portions of the subsequent media segment to be played during playback of the interstitial segment, thereby reducing the risk of buffer underrun when playback of the subsequent media begins. One drawback of this approach, however, is that the user sometimes has to wait a long time for the interstitial segment to complete and playback of the subsequent media segment to begin, especially in situations where the user makes a quick choice at a given choice point. In such situations, the user can become disengaged from the interactive media title unless the interstitial segment is sufficiently interesting. From a creative perspective, though, generating an interesting interstitial segment is challenging because the content of the interstitial segment may not necessarily reflect a choice made by the user during a corresponding choice point. Consequently, interstitial segments designed to be interesting and engaging may sometimes appear irrelevant in the context of the user's choices.

As the foregoing illustrates, what is needed in the art are more effective techniques for advancing between the media segments included in an interactive media title.

SUMMARY

Various embodiments include a computer-implemented method, including playing back at least a portion of an interstitial segment included in an interactive media title, where the interstitial segment indicates a set of options for a user to select, and each option corresponds to a different media segment included in the interactive media title, receiving, at a first point in time, a user selection of a first option included in the set of options, where the first option corresponds to a first media segment included in the interactive media title, determining a first playback position within the interstitial segment at which to begin playback of the first media segment based on a first portion of the One advantage of the disclosed techniques is that because the playback application only feeds portions of the interstitial segment to the media player when necessary, the media player can more quickly initiate seamless playback of a subsequent media segment in response to a user selection. Another advantage of the disclosed techniques is that the playback application can skip some or all of the remaining portions of the interstitial segment once a selection is made, thereby causing the endpoint device to appear responsive and potentially providing users with a sense of instant gratification while reducing the amount of time users need to wait.

One advantage of the disclosed techniques is that because the playback application only feeds portions of the interstitial segment to the media player when necessary, the media player can more quickly initiate seamless playback of a subsequent media segment in response to a user selection. Another advantage of the disclosed techniques is that the playback application can skip some or all of the remaining portions of the interstitial segment once a selection is made, thereby causing the endpoint device to appear responsive and potentially providing users with a sense of instant gratification while reducing the amount of time users need to wait.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
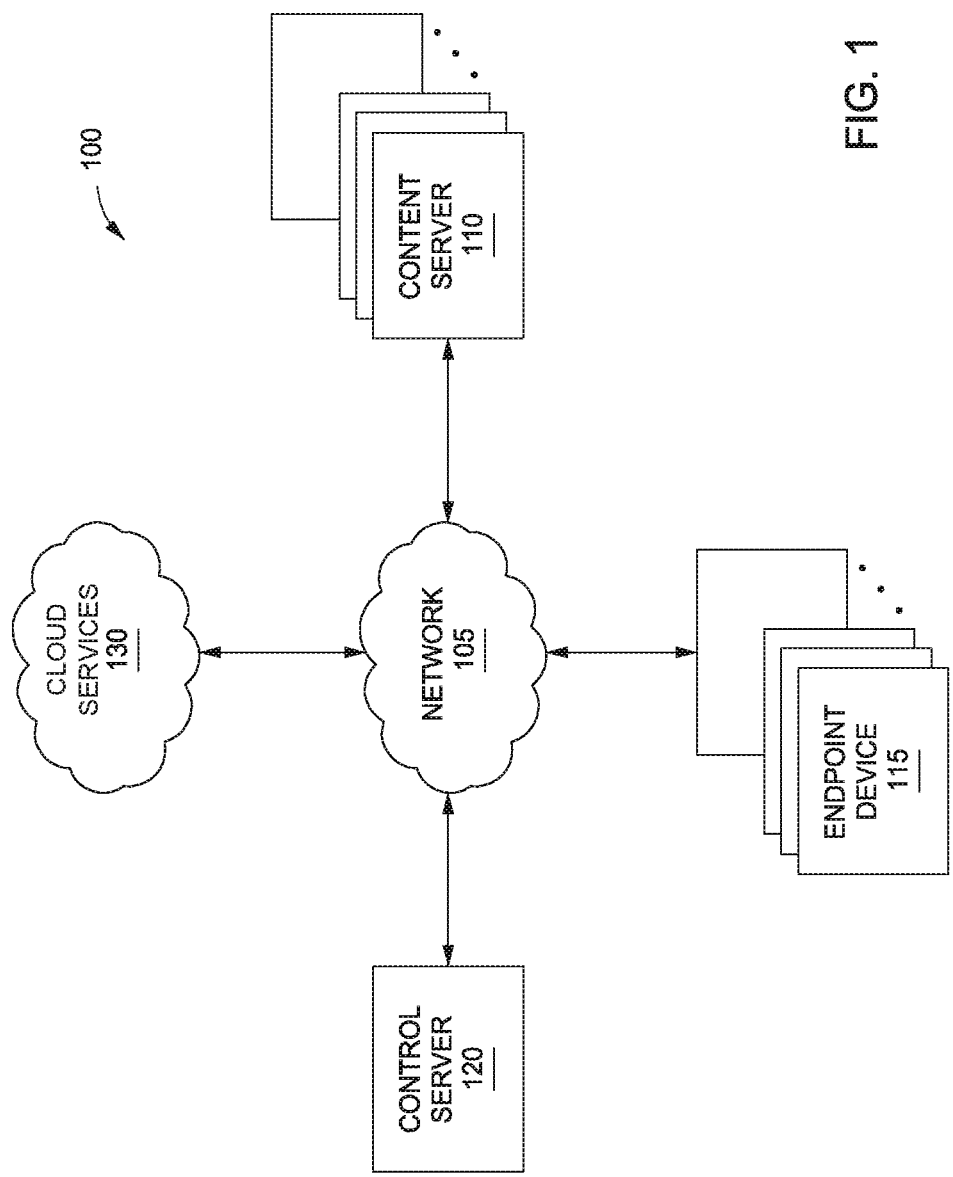
FIG. 1 illustrates a network infrastructure configured to implement one or more aspects of the various embodiments.

In the following description, numerous specific details are set forth to provide a more thorough understanding of the various embodiments. However, it will be apparent to one of skilled in the art that the inventive concepts may be practiced without one or more of these specific details.

A video streaming service provides users with access to various types of media titles. Typical media titles require minimal user input and are meant to be viewed in a relatively passive manner. Interactive media titles, by contrast, are designed to be interactive and to actively engage the user in making choices that affect the story being told. Because interactive media titles provide an alternative avenue for engaging particular types of users who are more interested in active participation, the generation and delivery of interactive media titles represents an important cornerstone in the ongoing effort to attract a growing user base. However, the process of keeping users engaged during the delivery of interactive media titles poses specific technical challenges.

As noted above, a typical interactive media title adheres to a structure that is fundamentally different compared to the linear structure associated with traditional media titles. Specifically, interactive media titles usually include media segments that tell different portions of various story arcs, as well as interstitial segments where the user is presented with a set of options that affect which story arc is followed. When the user reaches a choice point during playback of a given media segment, playback advances to an interstitial segment where the user is asked to select from a set of options. The interstitial segment typically plays during an allotment of time referred to herein as the "decision interval." When the user selects a particular choice, a conventional playback application initiates playback of a subsequent media segment associated with the particular choice via one of the following two approaches.

Via a first approach, the playback application initiates playback of the subsequent media segment by performing a "seek" operation. In so doing, the playback application advances playback past the remainder of the interstitial segment to the beginning of the subsequent media segment. This approach advantageously provides users with a sense of instant gratification because the endpoint device appears to operate responsively when a selection is made. However, the endpoint device typically cannot play the subsequent media segment immediately because the endpoint device first has to unload the remainder of the interstitial segment and then has to buffer at least a portion of the subsequent media segment, potentially taking several seconds. Older endpoint devices in general, and older smart television sets in particular, are especially vulnerable to these issues. While the endpoint device performs the above operations to prepare the subsequent media segment, a message is usually displayed indicating that the endpoint device is not yet ready to play the subsequent media segment and the user should wait. Messages directed towards the user tend to break user engagement.

Via a second approach, the playback application continues playback of the interstitial segment for the remainder of the decision interval until the interstitial segment is complete. Then, the playback application advances playback to the beginning of the subsequent media segment. While the remainder of the interstitial segment plays, the playback application usually highlights the selected choice to provide feedback indicating that the selection was received. This approach advantageously keeps the user engaged with the story by avoiding the display of messages directed towards the user. Additionally, the endpoint device can buffer portions of the subsequent media segment while playback of the interstitial segment continues, potentially reducing the risk of buffer underrun during playback of the subsequent media segment. However, the user sometimes must wait for a long time before the interstitial segment completes, especially when the user makes a choice towards the beginning of the interstitial segment. In such situations the endpoint device can appear unresponsive to the user.

To address the above issues, various embodiments include a playback application that seamlessly advances playback of interactive media titles in response to user selections in a manner that minimizes latency and preserves user immersion in a narrative. When playback of the interactive media title reaches a decision interval, the playback application buffers a corresponding interstitial segment where one of more choices are presented to the user and also buffers portions of subsequent media segments associated with the one or more choices. The playback application feeds individual portions of the interstitial segment to a media player only when those portions are needed for display. When the user selects one of the choices displayed during the interstitial segment, the playback application stops buffering subsequent media segments associated with other choices, continues buffering the subsequent media segment associated with the selected choice, and stops feeding portions of the interstitial segment to the media player. The media player then begins feeding portions of the subsequent media segment associated with the selected choice to the media player. When the media player finishes outputting any remaining portions of the interstitial segment, the playback application seamlessly advances playback to the subsequent media segment. In so doing, the playback application adjusts one or more timestamps associated with the subsequent media segment so that the media player receives a continuous sequence of timestamps leading from the interstitial segment into the subsequent media segment. The playback application can also feed additional portions of the interstitial segment to the media player on an as-needed basis in order to allow additional portions of the subsequent media segment to be buffered, potentially avoiding buffer underrun when the subsequent media segment is played.

One advantage of the disclosed techniques is that because the playback application only feeds portions of the interstitial segment to the media player when necessary, the media player can more quickly initiate playback of a subsequent media segment in response to a user selection. Another advantage of the disclosed techniques is that the playback application can skip some or all of the remaining portions of the interstitial segment once a selection is made. Thus, the playback application can seamlessly advance to a subsequent media segment in an uninterrupted manner, thereby causing the endpoint device to appear responsive and potentially providing users with a sense of instant gratification. These technological advantages represent multiple technological advancements relative to prior art approaches.

System Overview

FIG. 1 illustrates a network infrastructure configured to implement one or more aspects of the various embodiments. As shown, network infrastructure 100 includes content servers 110, control server 120, and endpoint devices 115, each of which are connected via a communications network 105. Network infrastructure 100 is generally used to distribute content to content servers 110 and endpoint devices 115.

Each endpoint device 115 communicates with one or more content servers 110 (also referred to as "caches" or "nodes") via network 105 to download content, such as textual data, graphical data, audio data, video data, and other types of data. The downloadable content, also referred to herein as a "file," is then presented to a user of one or more endpoint devices 115. In various embodiments, endpoint devices 115 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Each content server 110 may include a web-server, database, and server application 217 configured to communicate with control server 120 to determine the location and availability of various files that are tracked and managed by control server 120. Each content server 110 may further communicate with cloud services 130 and one or more other content servers 110 in order "fill" each content server 110 with copies of various files. In addition, content servers 110 may respond to requests for files received from endpoint devices 115. The files may then be distributed from content server 110 or via a broader content distribution network. In some embodiments, content servers 110 enable users to authenticate (e.g., using a username and password) in order to access files stored on content servers 110. Although only a single control server 120 is shown in FIG. 1, in various embodiments multiple control servers 120 may be implemented to track and manage files.

In various embodiments, cloud services 130 may include an online storage service (e.g., Amazon® Simple Storage Service, Google® Cloud Storage, etc.) in which a catalog of files, including thousands or millions of files, is stored and accessed in order to fill content servers 110. Cloud services 130 also may provide compute or other processing services. Although only a single cloud services 130 is shown in FIG. 1, in various embodiments multiple cloud services 130 may be implemented.

Figure 2:
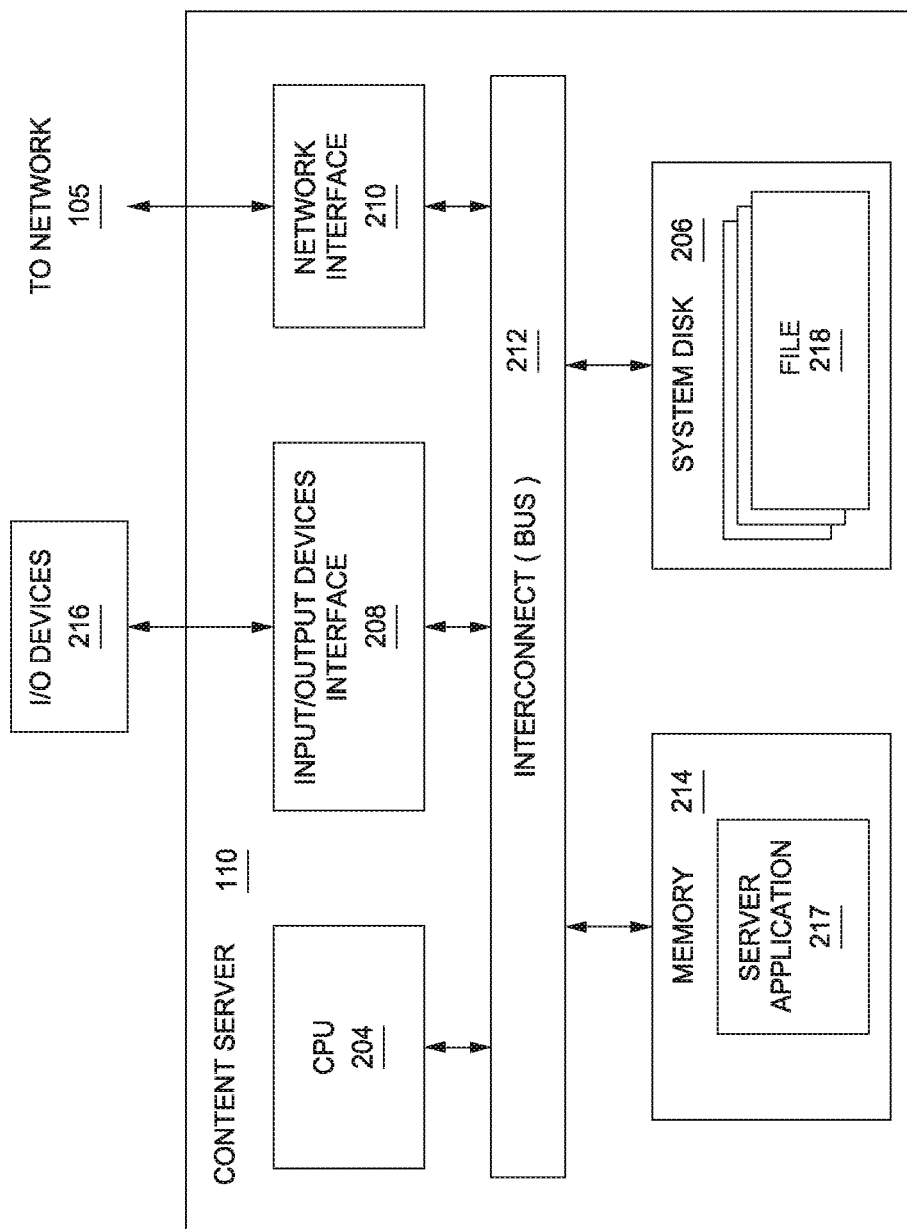
FIG. 2 is a block diagram of a content server that may be implemented in conjunction with the network infrastructure of FIG. 1, according to various embodiments.

FIG. 2 is a block diagram of a content server that may be implemented in conjunction with the network infrastructure of FIG. 1, according to various embodiments. As shown, content server 110 includes, without limitation, a central processing unit (CPU) 204, a system disk 206, an input/output (I/O) devices interface 208, a network interface 210, an interconnect 212, and a system memory 214.

CPU 204 is configured to retrieve and execute programming instructions, such as server application 217, stored in system memory 214. Similarly, CPU 204 is configured to store application data (e.g., software libraries) and retrieve application data from the system memory 214. Interconnect 212 is configured to facilitate transmission of data, such as programming instructions and application data, between CPU 204, system disk 206, I/O devices interface 208, network interface 210, and system memory 214. I/O devices interface 208 is configured to receive input data from I/O devices 216 and transmit the input data to CPU 204 via interconnect 212. For example, I/O devices 216 may include one or more buttons, a keyboard, a mouse, and/or other input devices. I/O devices interface 208 is further configured to receive output data from CPU 204 via interconnect 212 and transmit the output data to I/O devices 216.

System disk 206 may include one or more hard disk drives, solid state storage devices, or similar storage devices. System disk 206 is configured to store non-volatile data such as files 218 (e.g., audio files, video files, subtitles, application files, software libraries, etc.). Files 218 can then be retrieved by one or more endpoint devices 115 via network 105. In some embodiments, network interface 210 is configured to operate in compliance with the Ethernet standard.

System memory 214 includes a server application 217 configured to service requests for files 218 received from endpoint device 115 and other content servers 110. When server application 217 receives a request for a file 218, server application 217 retrieves corresponding file 218 from system disk 206 and transmits the file 218 to an endpoint device 115 or a content server 110 via network 105. Files 218 include a plurality of digital visual content items, such as videos and still images. In addition, files 218 may include metadata associated with such visual content items, user/subscriber data, etc. Files 218 that include visual content item metadata and/or user/subscriber data may be employed to facilitate the overall functionality of network infrastructure 100. In alternative embodiments, some or all of files 218 may instead be stored in a control server 120, or in any other technically feasible location within network infrastructure 100.

Figure 3:
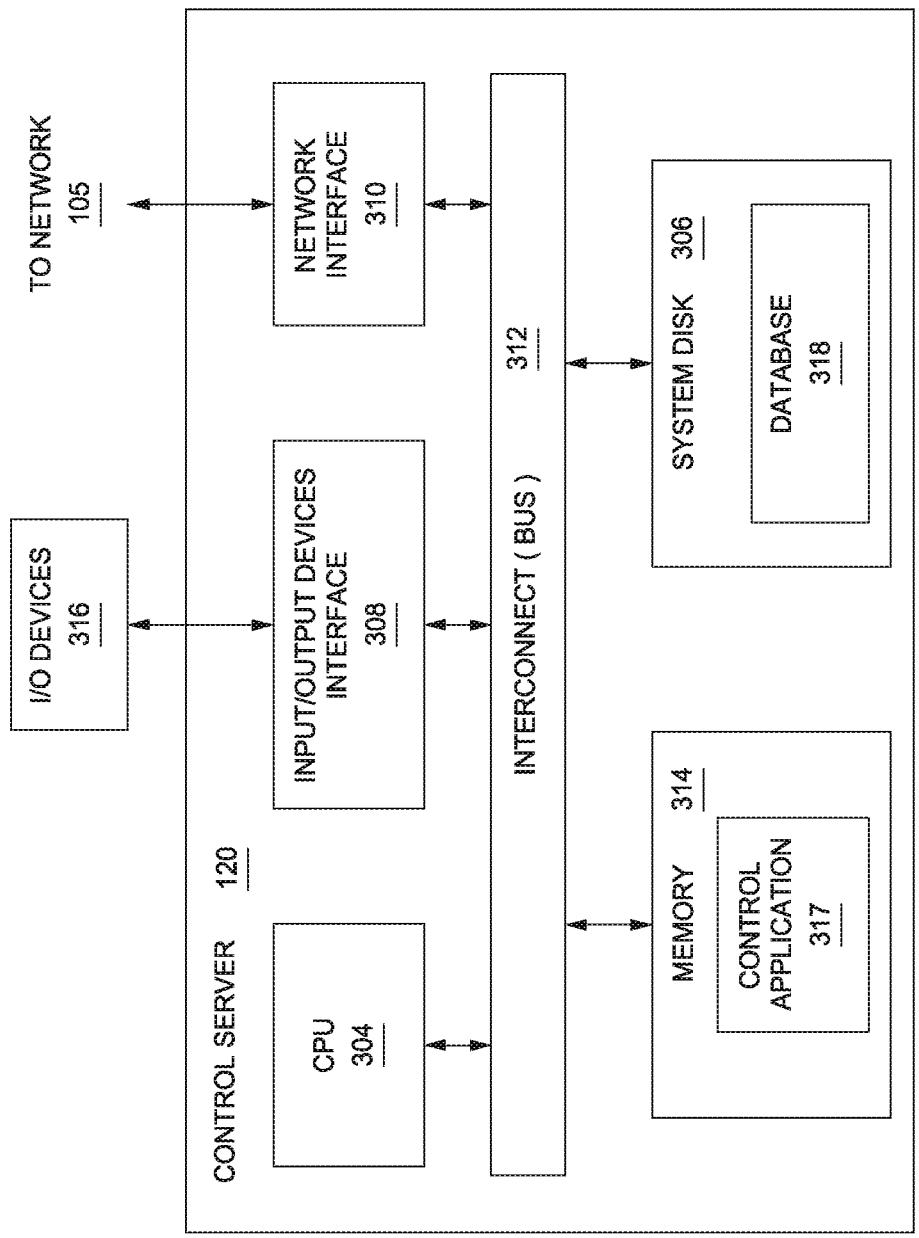
FIG. 3 is a block diagram of a control server that may be implemented in conjunction with the network infrastructure of FIG. 1, according to various embodiments.

FIG. 3 is a block diagram of a control server 120 that may be implemented in conjunction with the network infrastructure 100 of FIG. 1, according to various embodiments. As shown, the control server 120 includes, without limitation, a central processing unit (CPU) 304, a system disk 306, an input/output (I/O) devices interface 308, a network interface 310, an interconnect 312, and a system memory 314.

CPU 304 is configured to retrieve and execute programming instructions, such as control application 317, stored in system memory 314. Similarly, CPU 304 is configured to store application data (e.g., software libraries) and retrieve application data from system memory 314 and a database 318 stored in system disk 306. Interconnect 312 is configured to facilitate transmission of data between CPU 304, system disk 306, I/O devices interface 308, network interface 310, and system memory 314. I/O devices interface 308 is configured to transmit input data and output data between I/O devices 316 and CPU 304 via interconnect 312. System disk 306 may include one or more hard disk drives, solid state storage devices, and the like. System disk 206 is configured to store a database 318 of information associated with content servers 110, cloud services 130, and files 218.

System memory 314 includes a control application 317 configured to access information stored in database 318 and process the information to determine the manner in which specific files 218 will be replicated across content servers 110 included in the network infrastructure 100. Control application 317 may further be configured to receive and analyze performance characteristics associated with one or more of content servers 110 and/or endpoint devices 115. As noted above, in some embodiments, metadata associated with such visual content items, and/or user/subscriber data may be stored in database 318 rather than in files 218 stored in content servers 110.

Figure 4:
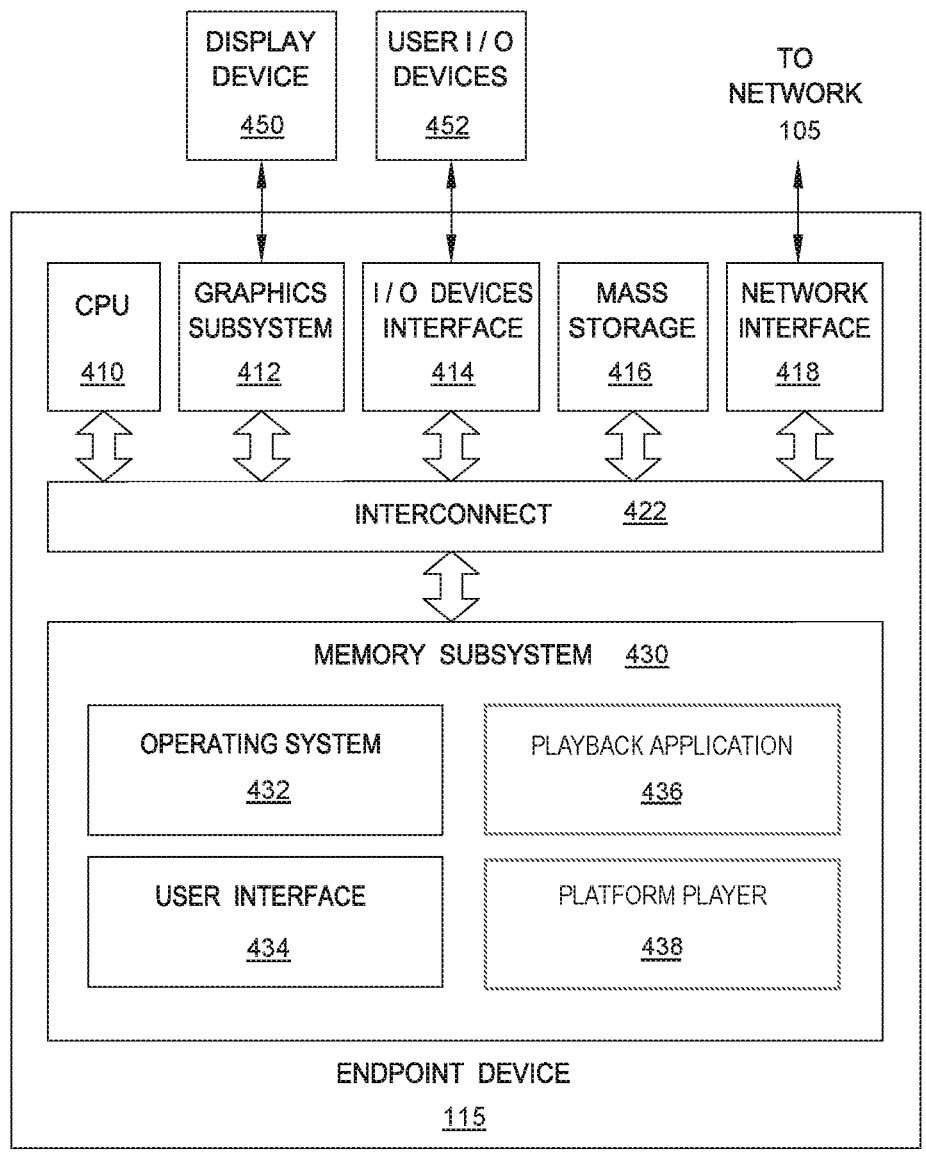
FIG. 4 is a block diagram of an endpoint device that may be implemented in conjunction with the network infrastructure of FIG. 1, according to various embodiments.

FIG. 4 is a block diagram of an endpoint device that may be implemented in conjunction with the network infrastructure of FIG. 1, according to various embodiments. As shown, endpoint device 115 may include, without limitation, a CPU 410, a graphics subsystem 412, an I/O device interface 414, a mass storage unit 416, a network interface 418, an interconnect 422, and a memory subsystem 430.

In some embodiments, CPU 410 is configured to retrieve and execute programming instructions stored in memory subsystem 430. Similarly, CPU 410 is configured to store and retrieve application data (e.g., software libraries) residing in memory subsystem 430. Interconnect 422 is configured to facilitate transmission of data, such as programming instructions and application data, between CPU 410, graphics subsystem 412, I/O devices interface 414, mass storage 416, network interface 418, and memory subsystem 430.

In some embodiments, graphics subsystem 412 is configured to generate frames of video data and transmit the frames of video data to display device 450. In some embodiments, graphics subsystem 412 may be integrated into an integrated circuit, along with CPU 410. Display device 450 may comprise any technically feasible means for generating an image for display. For example, display device 450 may be fabricated using liquid crystal display (LCD) technology, cathode-ray technology, and light-emitting diode (LED) display technology. An input/output (I/O) device interface 414 is configured to receive input data from user I/O devices 452 and transmit the input data to CPU 410 via interconnect 422. For example, user I/O devices 452 may comprise one of more buttons, a keyboard, and a mouse or other pointing device. I/O device interface 414 also includes an audio output unit configured to generate an electrical audio output signal. User I/O devices 452 includes a speaker configured to generate an acoustic output in response to the electrical audio output signal. In alternative embodiments, display device 450 may include the speaker. Examples of suitable devices known in the art that can display video frames and generate an acoustic output include televisions, smartphones, smartwatches, electronic tablets, and the like.

A mass storage unit 416, such as a hard disk drive or flash memory storage drive, is configured to store non-volatile data. A network interface 418 is configured to transmit and receive packets of data via network 105. In some embodiments, network interface 418 is configured to communicate using the well-known Ethernet standard. Network interface 418 is coupled to CPU 410 via interconnect 422.

In some embodiments, memory subsystem 430 includes programming instructions and application data that comprise an operating system 432, a user interface 434, a playback application 436, and a platform player 438. Operating system 432 performs system management functions such as managing hardware devices including network interface 418, mass storage unit 416, I/O device interface 414, and graphics subsystem 412. Operating system 432 also provides process and memory management models for user interface 434, playback application 436, and/or platform player 438. User interface 434, such as a window and object metaphor, provides a mechanism for user interaction with endpoint device 108. Persons skilled in the art will recognize the various operating systems and user interfaces that are well-known in the art and suitable for incorporation into endpoint device 108.

In some embodiments, playback application 436 is configured to request and receive content from content server 105 via network interface 418. Further, playback application 436 is configured to interpret the content and present the content via display device 450 and/or user I/O devices 452. In so doing, playback application 436 may generate frames of video data based on the received content and then transmit those frames of video data to platform player 438. In response, platform player 438 causes display device 450 to output the frames of video data. In one embodiment, platform player 438 is included in operating system 432.

In one embodiment, playback application 436 is configured to execute instructions associated with an interactive media title. The interactive media title includes a topology of narrative components that can be assembled based on user input to generate different story arcs. Each narrative component includes a media segment that relays a portion of a story and an interstitial segment during which a set of options are presented to the user. During playback of the interstitial segment, the user can select one of the presented options. In response, playback application 436 initiates playback of a subsequent media segment that is associated with the selected option. By selecting different options, the user can experience different story arcs. Playback application 436 implements specific techniques for initiating playback of media segments that minimize latency, thereby reducing the amount or time users have to wait after a selection is made. These techniques are described in greater detail below in conjunction with FIGS. 5-10.

Playback Application

Figure 5:
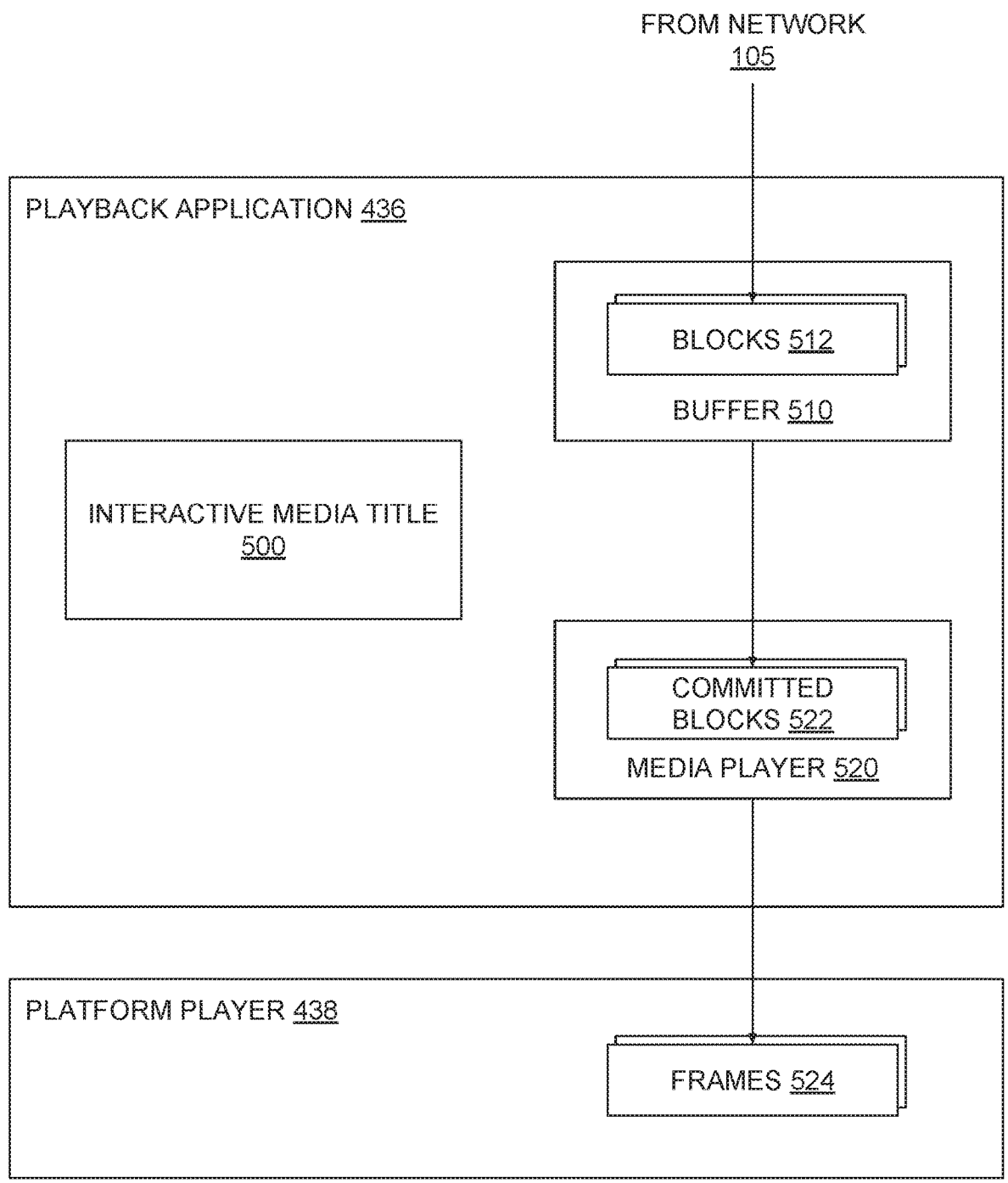
FIG. 5 is a more detailed illustration of the playback application of FIG. 5, according to various embodiments.

FIG. 5 is a more detailed illustration of the playback application of FIG. 5, according to various embodiments. As shown, playback application 436 includes an interactive media title 500, a buffer 510, and a media player 520. Playback application 436 generally obtains interactive media title 500 from content server 110 via network 105. Interactive media title 500 includes a topology of narrative components, as mentioned above, where each narrative component includes a media segment and an interstitial segment. Interactive media title 500 is described in greater detail below in conjunction with FIGS. 6-8.

Buffer 510 is configured to obtain blocks 512 of media content via network 105. In one embodiment, buffer 510 may be a JavaScript application. Each block 512 defines media content associated with interactive media title 500. Buffer 510 stores blocks 512 for subsequent playback. Before playback of interactive media title 500 reaches a given playback position associated with a particular block 512, buffer 510 transmits the given block 512 to media player 520. Media player 520 stores blocks received from buffer 510 as committed blocks 522. A committed block 524 is considered "committed" because that block cannot be unloaded from media player 520 without closing down and/or reinitializing media player 520. In one embodiment, media player 520 may be a C++ application. Based on committed blocks 522, media player 520 generates frames 524 and transmits those frames to platform player 438. Platform player 438 outputs frames 524 via display device 450.

In one embodiment, during playback of interactive media title 500, buffer 510 maximizes the number of blocks 512 that can be obtained via network 105. The number of blocks 512 that can be obtained generally depends on current network conditions, among other factors. Buffer 510 may transmit blocks to media player 520 on an as-needed basis, though, in order to minimize the number of committed blocks 522. By minimizing the number of committed blocks 522, playback application 436 can advance playback of interactive media title 500 quickly to different playback positions. In particular, once media player 520 processes any remaining committed blocks 522, media player 520 may then quickly receive other blocks associated with another playback position and begin generating frames based on those other blocks.

The approach described above differs from how a conventional playback application implements a "seek" operation to advance playback to a different playback position. Specifically, the media player included in a conventional playback application typically stores as many committed blocks as are available, but then must close down and/or reinitialize the media player to advance playback to a different playback position. Closing down and/or reinitializing the media player can take several seconds, during which the user has to wait. By minimizing the number of committed blocks 522 in the manner described above, playback application 436 minimizes the time needed to advance playback to a different playback position, thereby minimizing the amount of time the user has to wait. The disclosed approach is especially useful when implemented during playback of interactive media title 500. Interactive media title 500 is described in greater detail below in conjunction with FIGS. 6-8.

Interactive Media Title

Figure 6:
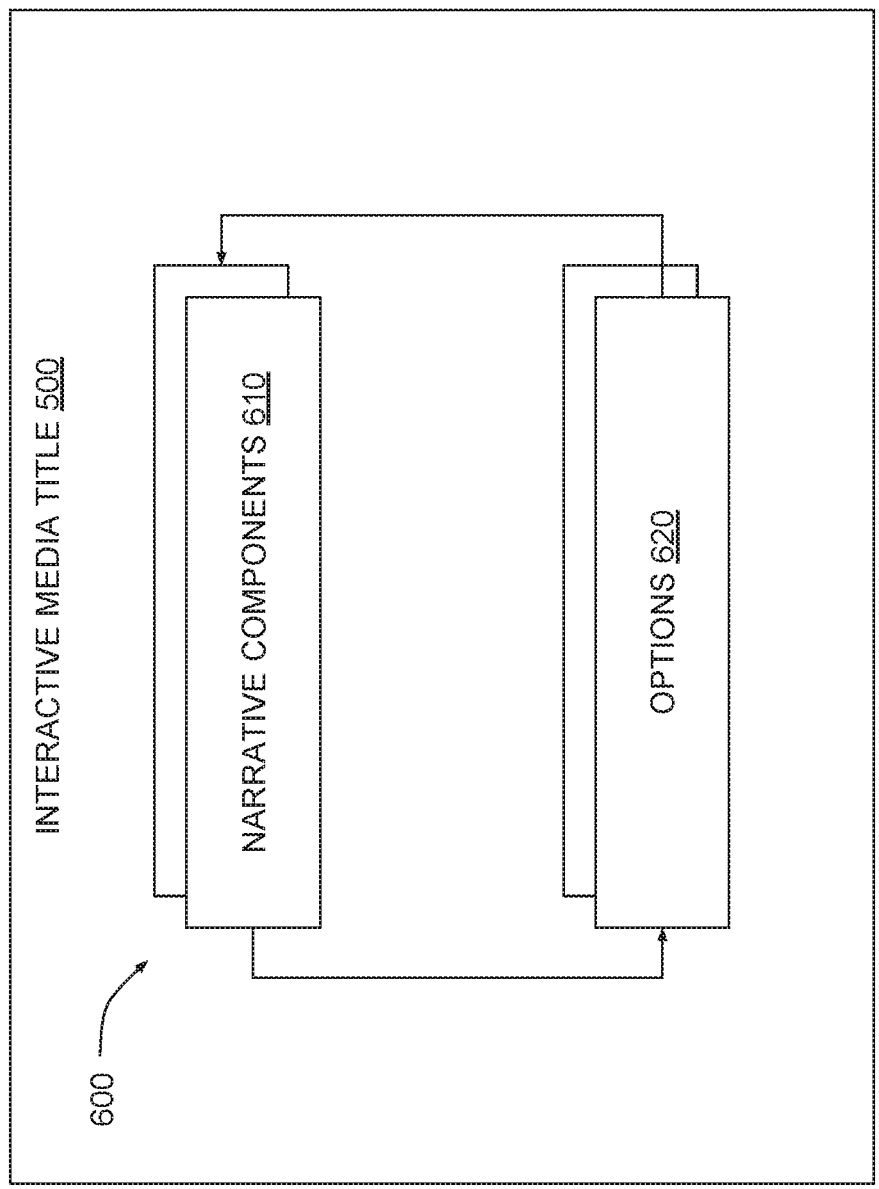
FIG. 6 is more detailed illustration of the interactive media title of FIG. 5, according to various embodiments.

FIG. 6 is more detailed illustration of the interactive media title of FIG. 5, according to various embodiments. As shown, interactive media title 500 includes a topology 600 that defines the structure of interactive media title 500. In particular, topology 600 includes narrative components 610 and options 620. Each narrative component 610 is associated with a different set of options 620. A given narrative component 610 includes a media segment that tells a portion of a story arc as well as an interstitial segment during which the user is presented with a choice between the corresponding set of options 620. The interstitial segment can include audio, video, as well as rendered user interface components indicating the particular set of options 620 available to the user, among other graphics. In one embodiment, the interstitial segment may continue telling the portion of the story arc initially set forth in the preceding media segment. Depending on which option 620 the user selects, playback can subsequently advance to different alternative narrative components 610. In one embodiment, the set of options 620 presented to the user in conjunction with a particular narrative component 610 may be configured based on profile data associated with the user and/or other users. In another embodiment, an option in the set of options 620 may lead to another interactive media title or a rendered user interface experience, among others. An exemplary portion of topology 600 is described in greater detail below in conjunction with FIG. 7.

Figure 7:
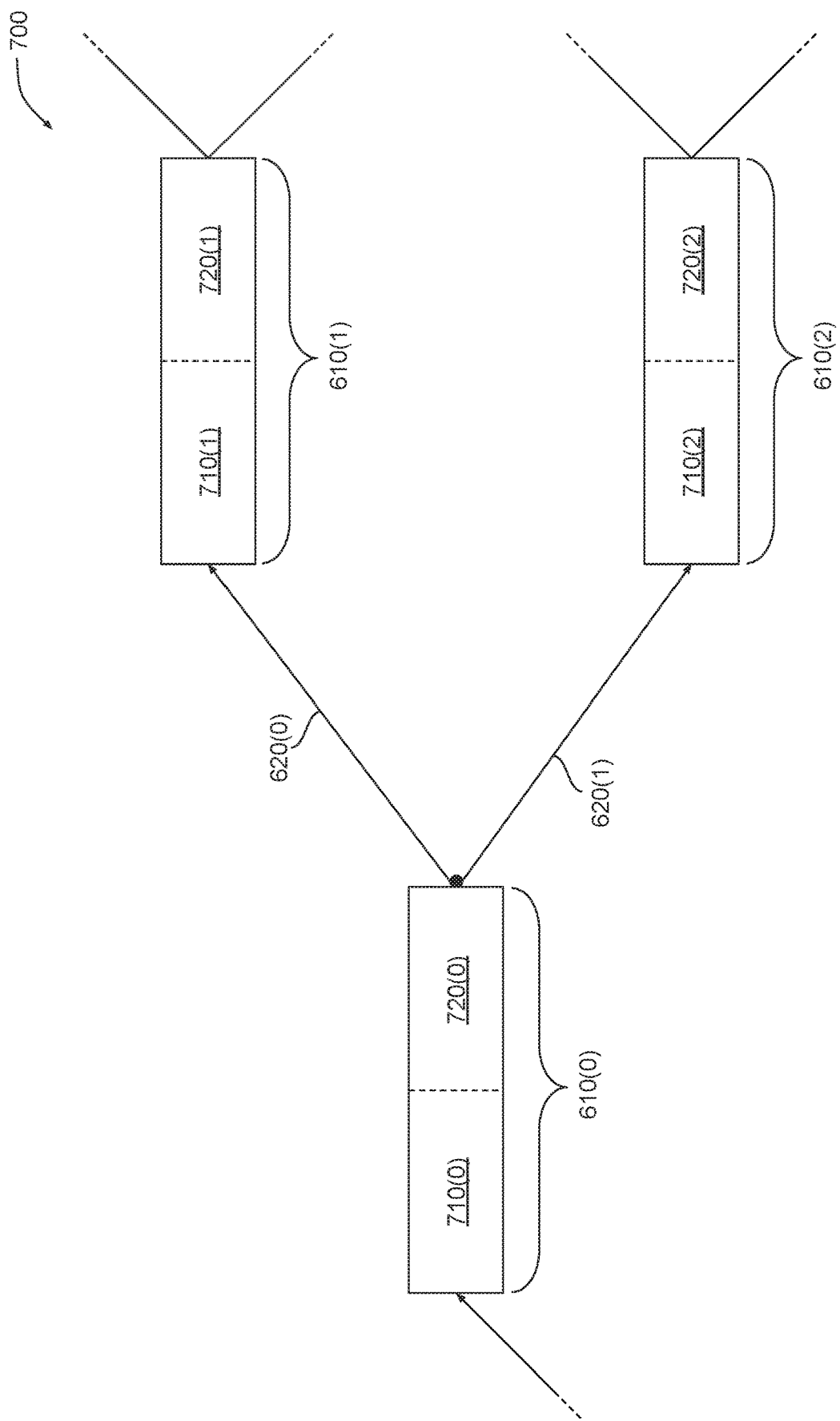
FIG. 7 illustrates an exemplary portion of the topology of FIG. 6, according to various embodiments.

FIG. 7 illustrates an exemplary portion of the topology of FIG. 6, according to various embodiments. As shown, portion 700 of topology 600 includes narrative components 610 and options 620. Each narrative component 610 includes a media segment 710 and an interstitial segment 720. Narrative component 610(0) is associated with options 620(0) and 620(1) and includes interstitial segment 720(0) during which the user is presented with a choice between options 620(0) and 620(1). Depending on which option the user selects, playback application 436 advances playback to either media segment 710(1) included in narrative component 610(1) or advances playback to media segment 710(2) included in narrative component 610(2). Media segment 710(1) portrays how the narrative unfolds when option 620(0) is selected. Alternatively, media segment 710(2) portrays how the narrative unfolds when option 620(1) is selected. An exemplary version of interstitial segment 710(0) is described in greater detail below in conjunction with FIG. 8.

Figure 8:
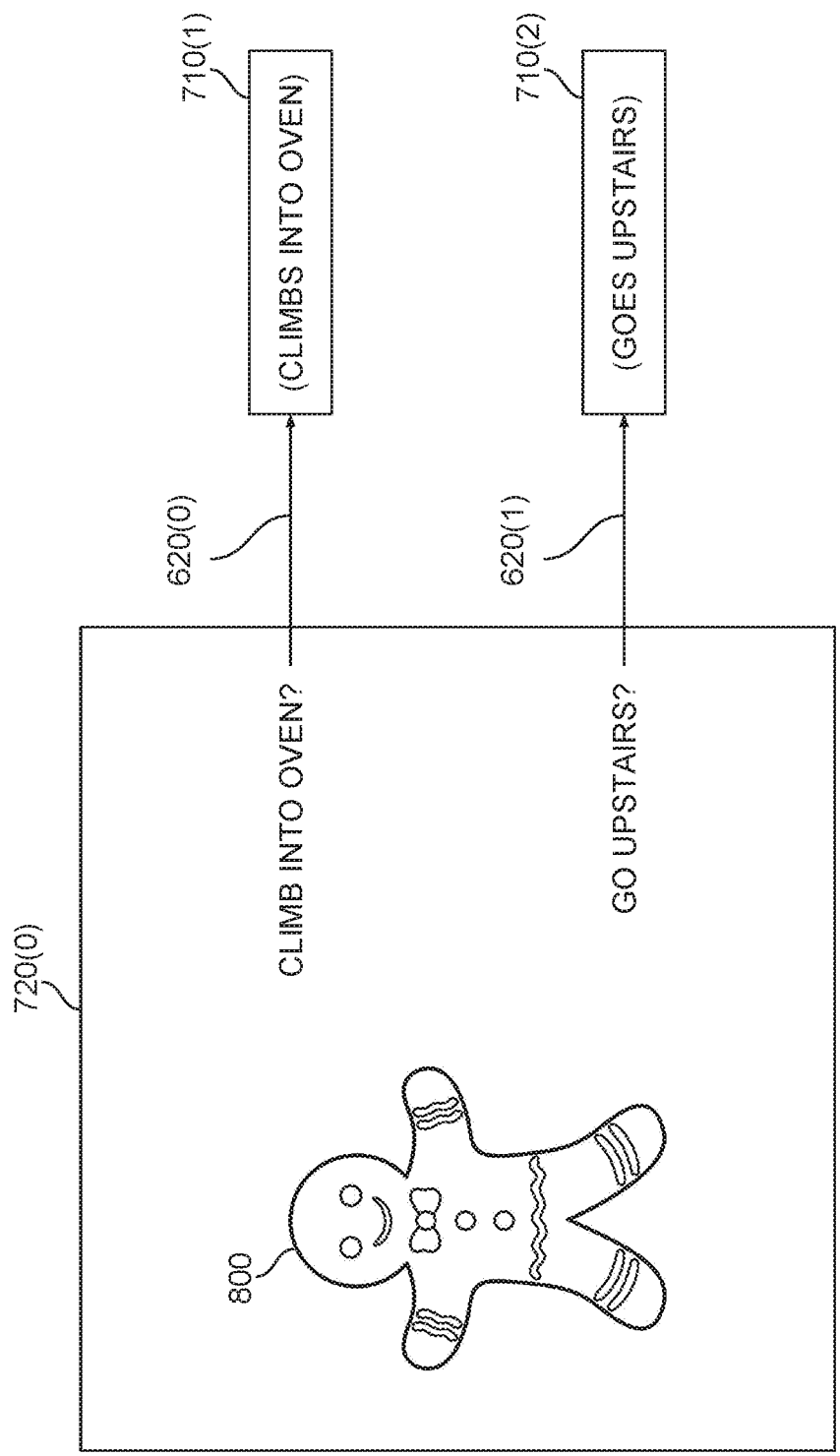
FIG. 8 illustrates an exemplary version of one of the interstitial segments of FIG. 7, according to various embodiments.

FIG. 8 illustrates an exemplary version of one of the interstitial segments of FIG. 7, according to various embodiments. As shown, interstitial segment 720(0) depicts a character 800 along with text describing options 620 to the user. Option 620(0) asks whether character 800 should climb into an oven. Option 620(1) asks whether character 800 should go upstairs. If the user selects option 620(0), then playback proceeds to media segment 710(1) that depicts character 800 climbing into the oven. Alternatively, if the user selects option 620(1), then playback proceeds to media segment 710(2) that depicts character 800 going upstairs. Playback application 436 plays interstitial segment 720(0) for an interval of time during which the user can select between options 620. That interval of time is referred to herein as the "choice interval." When the user selects a particular option 620 during the choice interval, playback application 436 subsequently initiates playback of a media segment corresponding to the selected option using a technique that is described below in conjunction with FIGS. 9A-9D.

FIGS. 9A-9D illustrate how the playback application of FIG. 5 seamlessly advances playback of an interactive media title in response to a user selection during a choice interval, according to various embodiments. Each of FIGS. 9A-9D depicts an interstitial segment 720 that playback application 436 buffers and outputs to the user, at least in part, to present the user with a choice of how the narrative should proceed.

Figure 9A:
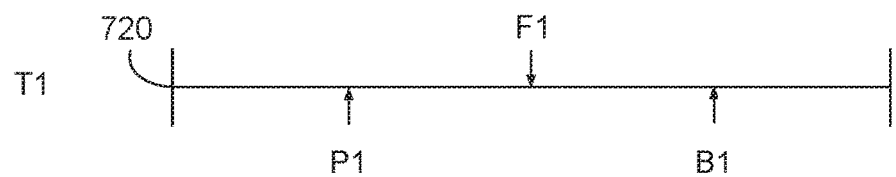
FIGS. 9A-9D illustrate how the playback application of FIG. 5 seamlessly advances playback of an interactive media title in response to a user selection during a choice interval, according to various embodiments.

As shown in FIG. 9A, at time T1, buffer 510 of FIG. 5 buffers an amount of interstitial segment 720 that corresponds to a buffer position B1. For example, buffer 510 could obtain a sequence of blocks 512 associated with a portion of interstitial segment 720 before buffer position B1. Buffer 510 generally buffers as much of interstitial segment 720 as network conditions allow. In addition, buffer 510 feeds a subset of the buffered portion of interstitial segment 720 to media player 520 of FIG. 5 that corresponds to a feed position F1. For example, media player 520 could include a sequence of committed blocks 522 associated with a portion of interstitial segment 720 before feed position F1. Buffer 510 incrementally feeds only a limited amount of the buffered portion of interstitial segment 720 to media player 520 in order to minimize latency involved with advancing the playback position.

Media player 520 causes display device 450 to output a portion of interstitial segment 720 that corresponds to a playback position P1. For example, media player 520 could transmit a frame 524 associated with playback position P1 to platform player 438 to be output via display device 450. Based on playback position P1, buffer 510 determines feed position F1 in order to minimize how much of the buffered portion of interstitial segment 720 is fed to media player 520 for display.

In one embodiment, playback application 436 may cause buffer 510 to transmit blocks 512 to media player 520 on a "just in time" basis, meaning that buffer 510 only transmits a given block 512 to media player 520 when playback advances to a position where the given block 512 is needed to generate a frame associated with that playback position. Different media players operating under different conditions may need different amounts of time to generate frames based on blocks 512. When transmitting blocks 512 on a "just-in-time" basis, playback application 436 initiates the feeding of blocks 512 sufficiently far in advance to provide media player 520 with sufficient time to process those blocks (depending on the capabilities of media player 520 and/or the associated operating conditions). Accordingly, when playback advances to a position where the frame is to be displayed, generation of the frame should be complete. Playback application 436 may also allocate extra time for media player 520 to process blocks 512 in order to account for real-time variations in the amount of time needed to generate frames. Playback application 436 may also cause buffer 510 to transmit sufficient blocks 512 to media player 520 to meet a minimum number of blocks associated with media player 520.

Figure 9B:
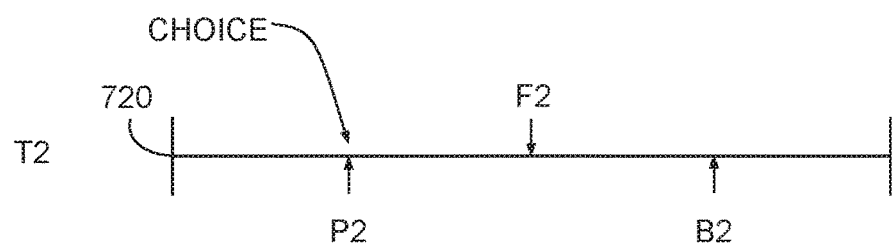

As shown in FIG. 9B, at time T2, the playback position advances to playback position P2, the feed position advances to feed position F2, and the buffer position advances to buffer position B2. In addition, the user makes a choice at playback position P2 and selects one of the options presented via interstitial segment 720. As noted previously, conventional playback applications perform one of two techniques when a user selects an option during an interstitial segment. With one technique, a conventional playback application performs a "seek" operation to advance playback to a subsequent media segment. With another technique, a conventional playback application plays out the entire remaining portion of the interstitial segment before advancing playback to the subsequent media segment. As also noted, with either of these two techniques the user typically has to wait for several seconds, especially with older endpoint devices. Playback application 436 performs an improved technique which minimizes the latency needed to advance playback in response to a user selection, as set forth below.

Figure 9C:
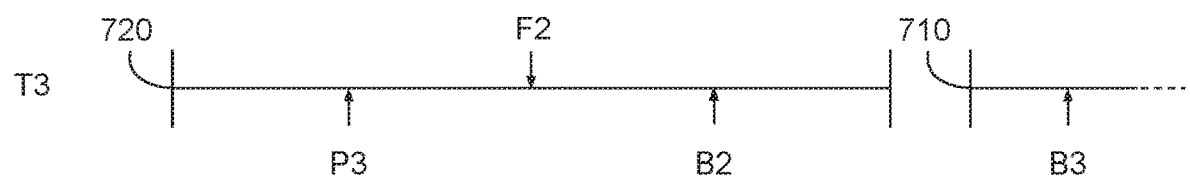

As shown in FIG. 9C, at time T3, buffer 510 stops buffering interstitial segment 720 and stops feeding the buffered portion of interstitial segment 720 to media player 520 for display. Playback of interstitial segment 720 continues to playback position P3. Buffer 510 buffers a portion of a media segment 710 up to a buffer position B3. Buffer 510 may have already started buffering media segment 710 in conjunction with buffering one or more other media segments. At time T3, buffer 510 stops buffering these other media segments. Because playback of interstitial segment 720 continues, buffer 510 can buffer the portion of media segment 710 transparently to the user. In one embodiment, playback application 436 may identify feed position F2 as a "splice point" where playback can be advanced to media segment 710 because no additional portions of interstitial segment 720 are fed to media player 520 past F2 and therefore no additional portions of interstitial segment 720 are displayed past F2.

Figure 9D:
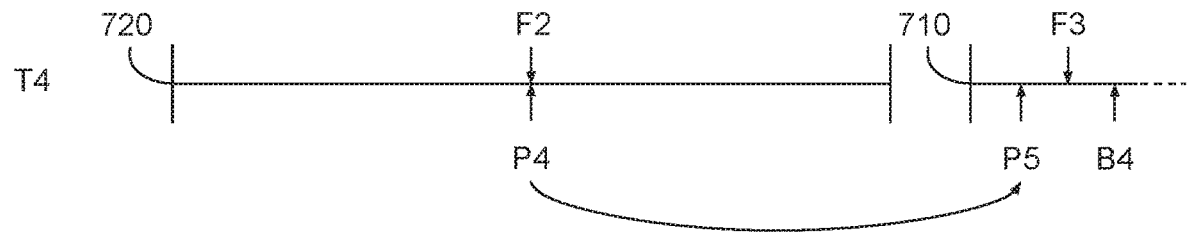

As shown in FIG. 9D, at time T4, playback application 436 buffers an additional portion of media segment 710 up to a buffer position B4. Playback advances to playback position P4 which coincides with feed position F2. Before playback of interstitial segment 720 catches up to feed position F2, playback application 436 feeds an amount of the buffered portion of media segment 710 up to feed position F3 to media player 520. Playback application 436 feeds media player 520 in this manner once the block ending at F2 has been fed. Playback application 436 then seamlessly advances playback past the remaining portion of interstitial segment 720 to a playback position P5 associated with the beginning of media segment 710. In so doing, playback application 436 updates a timestamp associated with media segment 710 and playback position P5 to correspond to playback position P4. Playback application 436 may also apply an offset to the timestamp so that media player 510 receives blocks with sequential timestamps.

With the approach described above in conjunction with FIGS. 9A-9C, when the user makes a particular choice during interstitial segment 720, playback application 436 need not close down and/or reinitialize media player 520 in order to advance playback to a media segment associated with the particular choice. In addition, playback application 436 need not play all of the remaining portion of interstitial segment 720. Accordingly, playback can be advanced seamlessly to a subsequent media segment in response to a user selection much faster than with conventional techniques, thereby promoting user engagement with interactive media titles. Persons skilled in the art will recognize how the techniques described herein can be applied to any technically feasible type of media title beyond interactive media titles. For example, the disclosed techniques could be implemented to seamlessly advance playback past an introductory portion of a media title or a recap portion of a media title.

In one embodiment, playback application 436 adaptively feeds additional portions of interstitial segment 720 to media player 520 based on an amount of media segment 710 that is currently buffered. For example, referring to FIG. 9D, suppose playback application 436 cannot buffer enough of media segment 710 at time T4 to avoid buffer underrun when playback of media segment 710 commences. In response, playback application 436 can feed an additional portion of interstitial segment 720 to media player 520 and continue playing interstitial segment 720. When a sufficient amount of media segment 710 is buffered, playback application 436 may then advance playback to the beginning of media segment 710.

In one embodiment, playback application 436 implements the techniques described herein to minimize the number of frames 526 that are transmitted to platform player 438 instead of minimizing the number of committed blocks 524 included in media player 524. In so doing, media player 520 may transmit frames 524 to platform player 438 only when a particular playback position is reached where those frames are needed for display. This approach may permit playback application 436 to advance playback to subsequent media segments rapidly because frames 524 need only be sent to platform player 438 several milliseconds in advance of when needed. Accordingly, when the user selects a particular option, playback application 436 may cause media player 520 to stop sending frames associated with interstitial segment 720 to platform player 438 and start sending frames associated with the media segment corresponding to the selected option.

Advancing Playback of Interactive Media Titles in Response to User Selections

Figure 10:
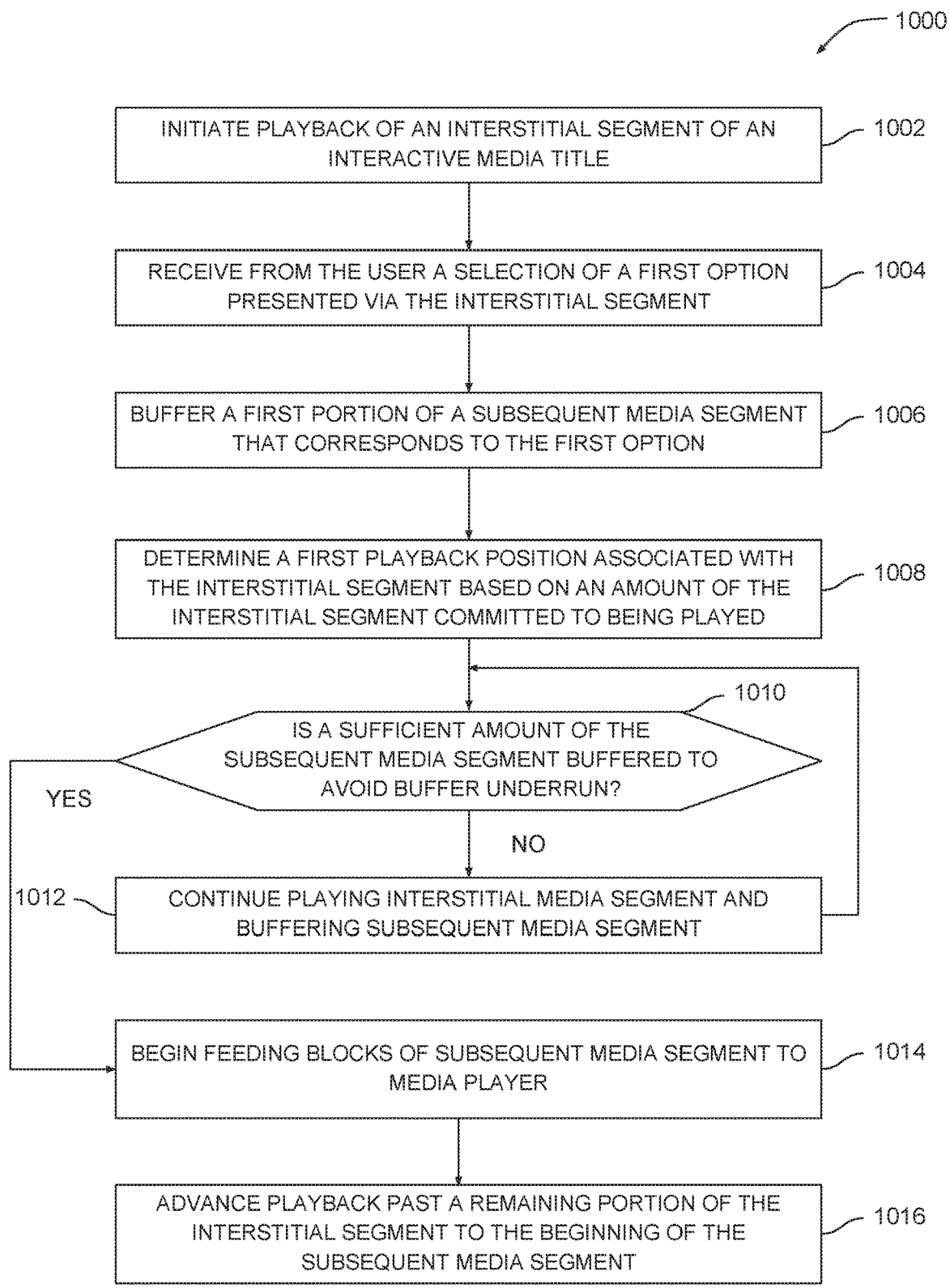
FIG. 10 is a flow diagram of method steps for advancing playback of an interactive media title in response to a user selection during a choice interval, according to various embodiments.

FIG. 10 is a flow diagram of method steps for advancing playback of an interactive media title in response to a user selection during a choice interval, according to various embodiments. Although the method steps are described in conjunction with the systems of FIGS. 1-9, persons skilled in the art will understand that any system configured to perform the method steps, in any order, is within the scope of the present invention.

As shown, a method 1000 begins at step 1002, where playback application 436 initiates playback of an interstitial segment of an interactive media title. The interactive media title includes a topology of narrative components that can be assembled to create different story arcs associated with a branching narrative. Each narrative component includes a media segment that tells a portion of a story and an interstitial segment that presents the user with a set of options. The user can select a particular option to change how the branching narrative unfolds. For example, one option could cause the story to unfold along a first story arc, while a second option could cause the story to unfold along a second story arc. Playback application 436 buffers as much of the interstitial segment as network conditions allow, but commits only a minimal amount of the interstitial segment to being played. In addition, playback application 436 buffers different portions of media segments corresponding to different options in advance of the user selecting any particular option. Various operations associated with step 1002 are described above in conjunction with FIG. 9A.

At step 1004, playback application 436 receives from the user a selection of a first option that is presented via the interstitial segment. In response to a user selection of an option, some conventional playback applications implement a "seek" operation to advance playback to a subsequent media segment associated with the selected option. This approach typically involves several time-consuming operations and so the user usually has to wait for several seconds. Alternatively, other conventional playback applications play the remaining portion of the interstitial segment to the user. With this approach, the user also has to wait while the interstitial segment finishes playing. Many users may become disengaged if asked to wait in this manner. Playback application 436 performs an improved technique that minimizes the latency involved with initiating playback of a subsequent media segment in response to a user selection. Various operations associated with step 1004 are described above in conjunction with FIG. 9B.

At step 1006, playback application 436 buffers a first portion of a subsequent media segment that corresponds to the first option. The subsequent media segment generally portrays how the story progresses relative to the selection of the first option. Playback application 436 stops buffering the interstitial segment and also stops feeding the buffered portions of the interstitial segment to media player 520 for playback. Playback application 436 also stops buffering portions of subsequent media segments associated with options not selected by the user. Playback application 436 need not close down and/or reinitialize media player 520 because media player 520 only includes a minimum number of committed blocks 522. Various operations associated with step 1006 are described above in conjunction with FIG. 9C.

At step 1008, playback application 436 determines a first playback position associated with the interstitial segment based on an amount of the interstitial segment that is committed to being played. In one embodiment, playback application 436 determines the number of committed blocks included in media player 520. In another embodiment, playback application 436 determines the number of frames 524 transmitted to platform player 438. The determined playback position represents a "splice point" where playback can safely be advanced to the buffered portion of the subsequent media segment without causing the user to wait for an excessive period of time. The position of the splice point may be influenced by the content of the interstitial segment. For example, the position of the splice point could be modified to avoid interrupting dialogue. Various operations associated with step 1008 are described above in conjunction with FIG. 9C.

At step 1010, playback application 436 determines whether a sufficient amount of the subsequent media segment is buffered to prevent buffer underrun. With unfavorable network conditions, less of the subsequent media segment can be buffered within a given time span and the risk of buffer underrun may be higher. With favorable network conditions, though, more of the subsequent media segment can be buffered within a given time span and the subsequent media segment can be played with minimal risk of buffer underrun.

If at step 1010 playback application 436 determines that an insufficient amount of the subsequent media segment is buffered, then the method proceeds to step 1012. At step 1012, playback application 436 continues playing the interstitial segment while also buffering additional portions of the subsequent media segment. In so doing, playback application 436 can feed additional blocks 512 to media player 520 or transmit additional frames 524 to platform player 438. The method then returns to step 1010 where playback application 436 again analyzes how much of the subsequent media segment is buffered.

If at step 1010 playback application 436 determines that a sufficient amount of the subsequent media segment is buffered, then the method proceeds to step 1014. At step 1014, playback application 436 begins feeding blocks of the subsequent media segment to media player 520. At step 1016, playback application 436 advances playback past a remaining portion of the interstitial segment and the first playback position to the beginning of the subsequent media segment. Playback application 436 modifies a timestamp associated with the subsequent media segment to allow playback to be advanced seamlessly. Playback of the subsequent media segment can commence with minimal delay because media player 520 need not be closed down and/or reinitialized and, additionally, the subsequent media segment is at least partially buffered. Accordingly, playback application 436 facilitates an engaging user experience with interactive media title 500 that minimizes delays and maximizes endpoint device responsiveness.

In sum, a playback application seamlessly advances playback of interactive media titles in response to user selections in a manner that minimizes latency and preserves user immersion in a narrative. When playback of the interactive media title reaches a decision interval, the playback application buffers a corresponding interstitial segment where one of more choices are presented to the user and also buffers portions of subsequent media segments associated with the one or more choices. The playback application feeds individual portions of the interstitial segment to a media player only when those portions are needed for display. When the user selects one of the choices displayed during the interstitial segment, the playback application stops buffering subsequent media segments associated with other choices, continues buffering the subsequent media segment associated with the selected choice, and stops feeding portions of the interstitial segment to the media player. The media player then begins feeding portions of the subsequent media segment associated with the selected choice to the media player. When the media player finished outputting any remaining portions of the interstitial segment, the playback application seamlessly advances playback to the subsequent media segment. In so doing, the playback application adjusts one or more timestamps associated with the subsequent media segment so that the media player receives a continuous sequence of timestamps from the interstitial segment into the subsequent media segment. The playback application can also feed additional portions of the interstitial segment to the media player on an as-needed basis in order to allow additional portions of the subsequent media segment to be buffered, potentially avoiding buffer underrun when the subsequent media segment is played.

One advantage of the disclosed techniques relative to the prior art is that, because the playback application only feeds portions of an interstitial segment to the media player when necessary, the media player can more quickly initiate seamless playback of a subsequent media segment in response to a user selection during a given choice interval. Another advantage of the disclosed techniques is that the playback application can skip some or all of the remaining portions of the interstitial segment once a selection is made during a given choice interval, thereby causing the endpoint device to appear responsive to a user's selection and providing the user with an improved sense of instant gratification. These technological advantages represent one or more technological advancements relative to prior art approaches.

1. Some embodiments include a computer-implemented method, comprising playing back at least a portion of an interstitial segment included in a media title, wherein the interstitial segment indicates a set of options for a user to select, and each option corresponds to a different media segment included in the media title, receiving, at a first point in time, a user selection of a first option included in the set of options, wherein the first option corresponds to a first media segment included in the media title, determining a first playback position within the interstitial segment at which to begin playback of the first media segment based on a first portion of the interstitial segment that already has been committed for playback as of the first time, automatically advancing playback of the media title past a remaining portion of the interstitial segment that occurs subsequent to the first playback position to a second playback position within the first media segment.

2. The computer-implemented method of clause 1, further comprising determining that the first portion of the interstitial segment has been committed for playback by determining that the first portion has been transmitted to a media player that is responsible for playing back the media title.

3. The computer-implemented method of any of clauses 1-2, further comprising buffering the first portion of the interstitial segment, buffering a second portion of the interstitial segment that is subsequent to the first portion of the interstitial segment, and transmitting the first portion of the interstitial segment to a media player for playback, but not transmitting the second portion of the interstitial segment to the media player for playback.

4. The computer-implemented method of any of clauses 1-3, further comprising buffering a first portion of the first media segment in response to receiving the user selection of the first option, wherein the first portion of the first media segment includes the second playback position.

5. The computer-implemented method of any of clauses 1-4, wherein the first playback position comprises a splice point at which playback of the media title advances seamlessly to the second playback position.

6. The computer-implemented method of any of clauses 1-5, wherein the first portion of the interstitial segment comprises a block of media content, and further comprising transmitting the block of media content to a media player, wherein the media player generates at least one frame of video data based on the block of media content and transmits the at least one frame of video data to a platform player for display via a display device.

7. The computer-implemented method of any of clauses 1-6, wherein the first portion of the interstitial segment comprises at least one frame of media data, and further comprising causing a media player to transmit the at least one frame of video data to a platform player for rendering via a rendering device.

8. The computer-implemented method of any of clauses 1-7, wherein the media title comprises a topology of narrative components that define different story arcs associated with a branching narrative and a plurality of options for selecting between the different story arcs.

9. The computer-implemented method of any of clauses 1-8, wherein the interstitial segment further indicates a second option that corresponds to a second media segment included in the media title, wherein the second media segment is not played back when the first option is selected.

10. Some embodiments include a non-transitory computer-readable medium that, when executed by a processor, causes the processor to perform the steps of playing back at least a portion of an interstitial segment included in a media title, wherein the interstitial segment indicates a set of options for a user to select, and each option corresponds to a different media segment included in the media title, receiving a user selection of a first option included in the set of options, wherein the first option corresponds to a first media segment included in the media title, determining a first playback position within the interstitial segment at which to begin playback of the first media segment based on a first portion of the interstitial segment that is currently committed for playback, automatically advancing playback of the media title past a remaining portion of the interstitial segment that occurs subsequent to the first playback position to a second playback position within the first media segment.

11. The non-transitory computer-readable medium of clause 11, further comprising the step of determining that the first portion of the interstitial segment has been committed for playback by determining that the first portion has been transmitted to a media player that is responsible for playing back the media title.

12. The non-transitory computer-readable medium of any of clauses 10-11, further comprising the steps of buffering the first portion of the interstitial segment, buffering a second portion of the interstitial segment that is subsequent to the first portion of the interstitial segment, and transmitting the first portion of the interstitial segment to a media player for playback, but not transmitting the second portion of the interstitial segment to the media player for playback.

13. The non-transitory computer-readable medium of any of clauses 10-12, wherein the first playback position is determined based further on an amount of the first media segment that has been buffered.

14. The non-transitory computer-readable medium of any of clauses 10-13, wherein the first portion of the interstitial segment comprises a block of media content, and further comprising transmitting the block of media content to a media player, wherein the media player generates at least one frame of media data based on the block of media content and transmits the at least one frame of media data to a platform player for rendering via a rendering device.

15. The non-transitory computer-readable medium of any of clauses 10-14, wherein playback of the at least a portion of the interstitial segment occurs in response to the media title reaching a choice point associated with the set of options.

16. The non-transitory computer-readable medium of any of clauses 10-15, wherein a media player that is responsible for playing back the media title does not discard any portion of the interstitial segment when playback of the media title is advanced to the second playback position.

17. The non-transitory computer-readable medium of any of clauses 10-16, wherein a media player that is responsible for playing back the media title is not re-initialized when playback of the media title is advanced to the second playback position.

18. Some embodiments include a system, comprising a memory storing a playback application, and a processor that, when executing the playback application, is configured to perform the steps of playing back at least a portion of an interstitial segment included in a media title, wherein the interstitial segment indicates a set of options for a user to select, and each option corresponds to a different media segment included in the media title, receiving, at a first point in time, a user selection of a first option included in the set of options, wherein the first option corresponds to a first media segment included in the media title, determining a first playback position within the interstitial segment at which to begin playback of the first media segment based on a first portion of the first media segment that has already been buffered as of the first time, automatically advancing playback of the media title past a remaining portion of the interstitial segment that occurs subsequent to the first playback position to a second playback position within the first media segment.

19. The system of clause 18, wherein a media player that is responsible for playing back the media title is not re-initialized when playback of the media title is advanced to the second playback position and does not discard any portion of the interstitial segment when playback of the media title is advanced to the second playback position.

20. The system of any of clauses 18-19, wherein the processor determines the first playback position based further on a first portion of the interstitial segment that is currently committed for playback.

Any and all combinations of any of the claim elements recited in any of the claims and/or any elements described in this application, in any fashion, fall within the contemplated scope of the present invention and protection The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine.

The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   playing back at least a portion of an interstitial segment included in a media title, wherein the interstitial segment indicates a set of selectable options, and each option corresponds to a different media segment included in the media title;
   receiving, at a first point in time, a selection of a first option included in the set of selectable options, wherein the first option corresponds to a first media segment included in the media title;
   determining a first playback position within the interstitial segment at which to begin playback of the first media segment, wherein the first playback position is different from a current playback position within the interstitial segment at the first point in time; and
   advancing playback of the media title past a remaining portion of the interstitial segment that occurs subsequent to the first playback position to a second playback position within the first media segment.

2. The computer-implemented method of claim 1, further comprising determining a first portion of the interstitial segment that has been committed when the selection of the first option is received.

3. The computer-implemented method of claim 2, further comprising:
   buffering the first portion of the interstitial segment;
   buffering a second portion of the interstitial segment that is subsequent to the first portion of the interstitial segment; and
   transmitting the first portion of the interstitial segment to a media player for playback, and not transmitting the second portion of the interstitial segment to the media player for playback.

4. The computer-implemented method of claim 1, further comprising buffering a portion of the first media segment in response to receiving the selection of the first option.

5. The computer-implemented method of claim 4, wherein the first playback position is determined based, at least in part, on an amount of the first media segment that has been buffered.

6. The computer-implemented method of claim 1, wherein the first playback position comprises a splice point at which playback of the media title advances seamlessly to the second playback position within the first media segment.

7. The computer-implemented method of claim 1, wherein the media title comprises different story arcs associated with a branching narrative and a plurality of options for selecting between the different story arcs.

8. The computer-implemented method of claim 1, further comprising:
   determining a first portion of the interstitial segment that has been committed when the selection of the first option is received; and
   prior to advancing playback of the media title, playing back the first portion of the interstitial segment.

9. The computer-implemented method of claim 1, further comprising determining a first portion of the interstitial segment that has been committed when the selection of the first option is received, wherein advancing playback of the media title does not comprise unloading the first portion of the interstitial segment.

10. One or more non-transitory computer-readable media including instructions that, when executed by one or more processors, cause the one or more processors to perform the steps of:
   playing back at least a portion of an interstitial segment included in a media title, wherein the interstitial segment indicates a set of selectable options, and each option corresponds to a different media segment included in the media title;
   receiving, at a first point in time, a selection of a first option included in the set of selectable options, wherein the first option corresponds to a first media segment included in the media title;
   determining a first playback position within the interstitial segment, wherein the first playback position is different from a current playback position within the interstitial segment at the first point in time; and
   advancing playback of the media title past a remaining portion of the interstitial segment that occurs subsequent to the first playback position to a second playback position within the first media segment.

11. The one or more non-transitory computer-readable media of claim 10, further comprising determining a first portion of the interstitial segment that has been committed when the selection of the first option is received.

12. The one or more non-transitory computer-readable media of claim 11, further comprising the steps of:
   buffering the first portion of the interstitial segment;
   buffering a second portion of the interstitial segment that is subsequent to the first portion of the interstitial segment; and
   transmitting the first portion of the interstitial segment to a media player for playback, and not transmitting the second portion of the interstitial segment to the media player for playback.

13. The one or more non-transitory computer-readable media of claim 10, wherein the interstitial segment further indicates a second option that corresponds to a second media segment included in the media title.

14. The one or more non-transitory computer-readable media of claim 13, further comprising:
   buffering a portion of the first media segment prior to receiving the selection of the first option; and
   buffering a portion of the second media segment prior to receiving the selection of the first option.

15. The one or more non-transitory computer-readable media of claim 14, further comprising, upon receiving the selection of the first option:
   continuing buffering of the first media segment; and
   stopping buffering of the second media segment.

16. The one or more non-transitory computer-readable media of claim 15, wherein the first playback position is determined based, at least in part, on an amount of the first media segment that has been buffered.

17. The one or more non-transitory computer-readable media of claim 10, wherein a media player that is responsible for playing back the media title is not re-initialized when playback of the media title is advanced to the second playback position.

18. A system, comprising:
   a memory storing a playback application; and
   a processor that, when executing the playback application, performs the steps of:
      playing back at least a portion of an interstitial segment included in a media title, wherein the interstitial segment indicates a set of selectable options, and each option corresponds to a different media segment included in the media title,
      receiving, at a first point in time, a selection of a first option included in the set of selectable options, wherein the first option corresponds to a first media segment included in the media title,
      determining a first playback position within the interstitial segment, wherein the first playback position is different from a current playback position within the interstitial segment at the first point, and
      advancing playback of the media title past a remaining portion of the interstitial segment that occurs subsequent to the first playback position to a second playback position within the first media segment.

19. The system of claim 18, wherein the processor further performs the steps of:
   determining a first portion of the interstitial segment that has been committed when the selection of the first option is received; and
   prior to advancing playback of the media title, playing back the first portion of the interstitial segment.

20. The system of claim 18, wherein the processor further performs the step of determining a first portion of the interstitial segment that has been committed when the selection of the first option is received, wherein advancing playback of the media title does not comprise unloading the first portion of the interstitial segment.

* * * * *